United States Patent [19]

Connor

[11] 4,090,221
[45] May 16, 1978

[54] APPARATUS FOR IMPROVING VIDEO SIGNAL-TO-NOISE RATIO

[75] Inventor: Denis John Connor, New Shrewsbury, N.J.

[73] Assignee: Bell Telephone Laboratories, Incorporated, Murray Hill, N.J.

[21] Appl. No.: 234,169

[22] Filed: Mar. 13, 1972

[51] Int. Cl.$^2$ .................... H04N 7/12; H04N 5/21
[52] U.S. Cl. .................... 358/166; 358/105; 358/136; 358/167
[58] Field of Search ....... 178/5.2 R, 5.2 CD, DIG. 3; 358/12, 36, 37, 105, 166, 167, 133, 135, 136, 31, 8

[56] References Cited

U.S. PATENT DOCUMENTS

| | | | |
|---|---|---|---|
| 2,906,816 | 9/1959 | Kretzmer | 358/133 |
| 3,184,542 | 5/1965 | Horsley | 358/136 |
| 3,265,810 | 6/1966 | Falk | 358/31 |
| 3,594,498 | 7/1971 | Smith | 358/8 |
| 3,674,920 | 7/1972 | Faroudja | 358/31 |

Primary Examiner—Howard W. Britton
Attorney, Agent, or Firm—Daniel D. Dubosky

[57] ABSTRACT

An input video signal is coupled to one input of a summing amplifier, to the input of a low-pass filter, and to one input of a movement detector. The output signal from the apparatus is delayed by one frame interval, and this delayed output signal is coupled to a second input of the summing amplifier and to a second input of the movement detector. The movement detector is of a type which generates a control signal to indicate movement in response to a plurality of frame-to-frame differences for adjacent picture elements. This control signal is utilized to selectively gate either the output from the summing amplifier or the output of the low-pass filter through to an output terminal.

11 Claims, 4 Drawing Figures

APPARATUS FOR IMPROVING VIDEO SIGNAL-TO-NOISE RATIO

BACKGROUND OF THE INVENTION

This invention relates to video signal processing apparatus and, more particularly, to apparatus which decreases the subjectively annoying effects of an extraneous signal on a video signal.

Video signals, when transmitted over open-wire lines for extended lengths, are subjected to unwanted interference. In addition, video signals in fringe areas of reception may be so weak that the ever-present Johnson or white noise may mask the actual picture element values in the receiving apparatus and create what is known as "snow" in the television art. In the fringe areas of reception, early receiving apparatus was frequently preceded by an amplifying device or booster which effectively decreased the bandwidth of the receiving apparatus in order to remove the effects of as much noise as possible. In so doing, these amplifiers also removed the high frequency energy present in the video signal and the resulting picture suffered from a noticeable decrease in horizontal resolution. The effects of the random noise, however, were reduced from a subjective standpoint.

In still other prior art apparatus of the type disclosed in U.S. Pat. No. 2,841,645 of July 1, 1958 to M. J. Stateman, the video signal is coupled through an amplitude gate whose transfer characteristics are determined by an output signal which has been delayed by a field or frame interval. If the input video signal is equal in amplitude to the delayed output signal, within the limits of some predetermined range, the input video signal is coupled without change to the output. If, however, the input video signal is outside of the predetermined range established by the output signal, the input video signal is clamped to either the upper or lower limit of the established range. As a result, the amplitude for any picture element is not permitted to change during any given frame interval by more than a threshold level. Any unwanted noise which is uncorrelated to the frame interval is effectively clipped so as to reduce its subjective effect on the picture. The Stateman apparatus works well for pictures that are stationary or for very slow movements within the picture. However, as the movements in the picture accelerate, the Stateman apparatus produces a streaking since picture element values are not able to change as rapidly as the moving objects in the picture demand.

SUMMARY OF THE INVENTION

A primary object of the present invention is to reduce the annoying effects introduced by noise into a video signal without introducing additional annoying effects in the form of either a streaking or blurring of the picture. This object and others are achieved in accordance with the present invention wherein an input video signal is effectively separated into stationary and moving segments by the operation of a movement detector which responds to frame-to-frame differences over a plurality of picture elements in order to produce an indicating signal at its output. The input video signal is selectively coupled by a transmission gate operating in response to the indicating signal either through a first filter during the stationary segments of the picture or through a second filter during the moving segments of the picture. The first filter combines a fractional part of the input video signal with a fractional part of an output signal which has been delayed by one video frame interval. The second filter reduces the passband presented to the video signal to a bandwidth which corresponds to the resolution normally present in the moving area of the picture.

BREIF DESCRIPTION OF THE DRAWING

The invention will be more readily understood after reading the following detailed description in conjunction with the drawing in which:

FIG. 1 is a schematic block diagram of apparatus constructed in accordance with the present invention; and FIGS. 2 and 3 when placed together in accordance with the diagram shown in FIG. 4 provide a schematic block diagram of the movement detector shown as a block in FIG. 1.

DETAILED DESCRIPTION

Figure 1:
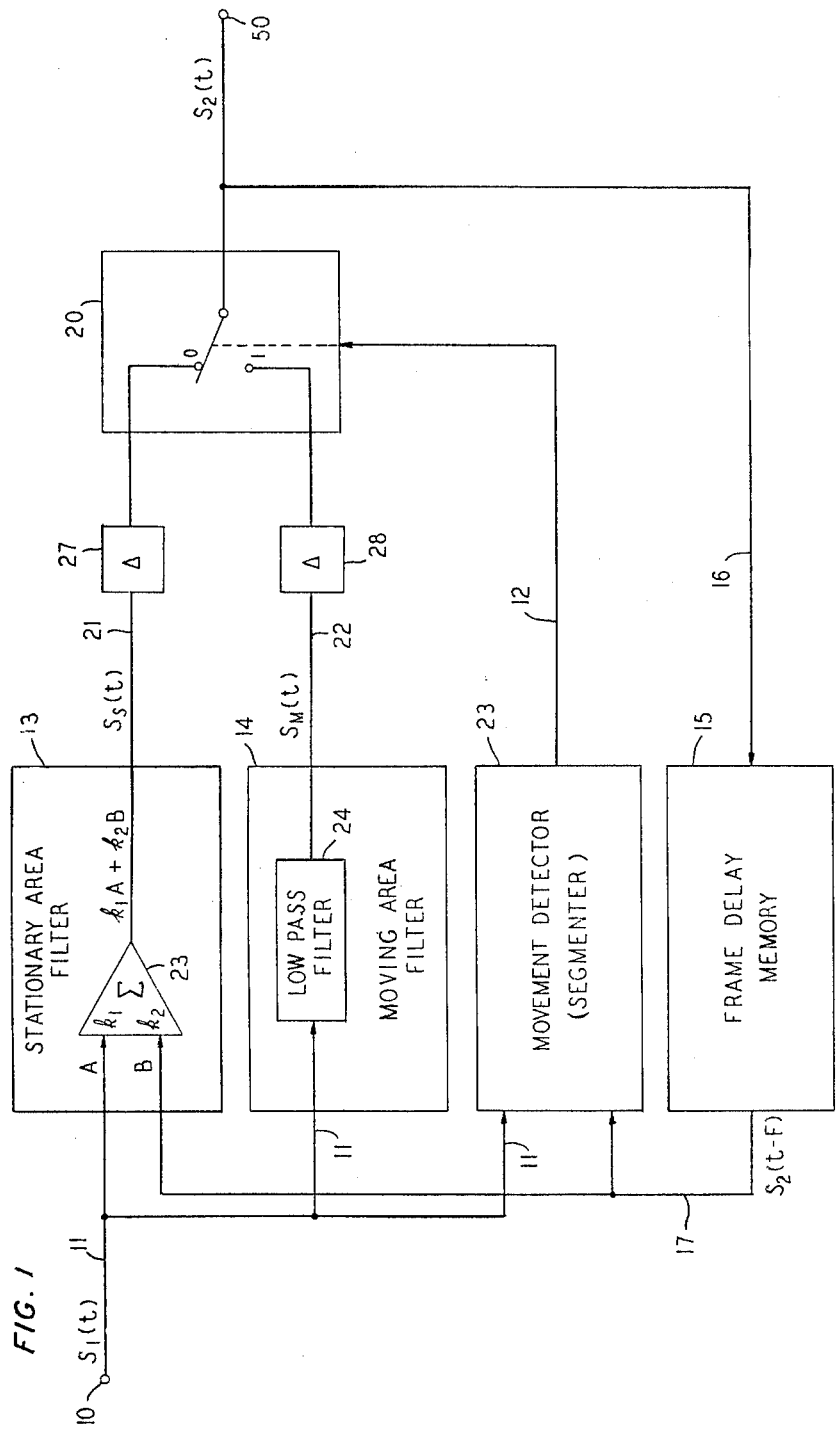

In FIG. 1, a video signal at input termainal 10 is coupled by way of line 11 to the input of a stationary area filter 13 and to the input of a moving area filter 14. Line 11, like all other lines in the drawing, is actually a transmission path having two conducting paths between which a potential can be measured. This potential in the present embodiment represents the video signal amplitude. The video signal on line 11 is of a standard type with the amplitude of the signal representing the brightness of spatial points within a picture and with the signal made up of segments each one of which represents a horizontal line of spatial points. The video lines are separated by horizontal and vertical blanking intervals during which a scanning beam is permitted to be relocated on the format of spatial points. The scanning may be either of the line interlace type or of the line sequential type. In addition, the signal on line 11 may also include an extraneous noise of the type which is uncorrelated with respect to the video frame intervals, that is to say, the amplitude of the noise bears no fixed relationship to its position within the video frame interval.

Line 11 is also connected to one input of a movement detector 23. The other input of movement detector 23 is connected to the output of frame delay memory 15 which may be constructed of a circulating acoustic delay line or of a circulating loop of magnetic video tape. The input of frame delay memory 15 is connected by way of a line 16 to an output terminal 50. Frame delay memory 15 is constructed with sufficient length so as to present a delay approximately equal to one video frame interval to the signals presented on line 16. In the present embodiment, frame delay memory 15 presents a delay which is less than one video frame interval by the amount of time which separates five adjacent picture elements in the video signal on line 11. This slight departure from an exact video frame interval results from a small amount of delay present in movement detector 23 which is to be described hereinafter in connection with FIGS. 2 and 3. As will be apparent hereinafter, the total delay in the entire circuit is such that the amplitude on line 17 at the output of memory 15 is the amplitude for the same spatial point presently represented on line 11 but the amplitude on line 17 is for an instant one video frame interval earlier in time.

As will be more completely described hereinafter in connection with FIGS. 2 and 3, movement detector 23 utilizes the video signals on lines 11 and 17 to drive frame-to-frame difference signals. These frame-to-frame difference signals are then utilized within movement detector 23 for the purpose of determining whether or not the video signal amplitude present on line 11 belongs to a moving or stationary area of the picture. As is further pointed out in connection with FIGS. 2 and 3, this decision by movement detector 23 is dependent on more than a single frame-to-frame difference. It is essentially dependent on an averaging process which takes place over an entire area of picture elements. As a result, the picture element amplitudes represented by the video signal on line 11 tend to be segmented in the sense that adjacent picture elements are usually determined to belong to the same type of area. In fact, individual picture elements are prohibited by the movement detector from producing an output state opposite to that of the picture elements on both sides of it. As a result of these operational characteristics, this type of movement detector is called a segmenter by those skilled in the art. The operation of movement detector 23 is relatively independent of noises that are uncorrelated with respect to the video frame interval. Hence, the output of movement detector 23, represented by a logical state on line 12, is also independent of the noise present in the video signal.

The output of movement detector 23 is coupled by line 12 to the control input of a transmission gate 20. Transmission gate 20 has two inputs, one of which is connected by way of a delay circuit 27 to the output of the stationary area filter 13 and the other of which is connected by way of delay circuit 28 to the output of moving area filter 14. The delay for each of the circuits 27 and 28 is chosen to make the signals at each of the inputs of gate 20 delayed from the signal on line 11 by an amount equal to the delay inherent in movement detector 23.

If a logical "0" state is present on line 12, the signal on line 21 at the output of the stationary area filter 30 is coupled through transmission gate 20 to output terminal 15. On the other hand, if a logical "1" state is present on line 12, the signal on line 20 at the output of the moving area filter 14 is coupled through transmission gate 20 to the output terminal 50. Transmission gate 20 is actually constructed of a plurality of transmission gates, one of which is energized by one state on line 12 and the other of which is energized by a second state on line 12. In summary, movement detector 23 separates the video signal on line 11 into moving and stationary parts. The stationary parts are coupled through filter 13 to output terminal 50. The moving parts of the signal are coupled through filter 14 to output terminal 50.

In stationary parts of the picture, there is an excess of temporal resolution, that is to say, the value of each picture element is actually presented with greater frequency than it need be presented. For parts of the picture that are stationary, without any movement at all, the picture of course may be created by simply repeating the picture element amplitudes that have been received during previous frame intervals. To minimize the effects of noise in the stationary area while still accommodating slow movements, stationary area filter 13 develops its output signal on line 21 by combining a fractional part of the video signal on line 11 with a fractional part of the delayed output video signal on line 17. To accomplish this end in the present embodiment, the video signals on lines 11 and 17 are each connected to one input of a summing amplifier 23. In particular summing amplifier 23 develops its output signal on line 21 by taking 50 percent of the signal amplitude on line 11 and adding it to 50 percent of the amplitude of the signal on line 17. It is, of course, to be understood that these precise percentage values are in no way necessary to practice the present invention. Other values may also be chosen in order to satisfy the particular picture statistics presented by the video signal on line 11.

Hence, if a noise impulse on line 11 should increase or decrease the picture element values represented by the video signal on line 11, the effect that the noise impulse has on the output signal is cut in half by the action of summing amplifier 23 since the amplitude of that picture element during the previous frame interval was most probably not affected by the noise.

As is well known to those skilled in the art, the integrating effect present in the light-sensitive face of a video camera causes a blurring of any object which is moving in a picture. This blurring effect represents a decrease in the bandwidth of the video signal. It is a phenomenon of human vision that this blurring is perfectly acceptable for areas of the picture containing rapid movement. Even though the frequencies present in the signal representing areas of movement have been reduced by the integrating effect of the camera, the passband of the transmission system utilized to transmit this signal remains at a constant value. The passband of the transmission system, of course, determines the amount of noise energy coupled through to the receiving apparatus for all noises having energy spectrums which overlap the passband of the system.

In accordance with the present invention, the parts of the video signal on line 11 which represent movement are coupled through a low-pass filter 24. This filter reduces the bandwidth of the video channel by approximately 50 percent. For a video-telephone signal normally coupled through a 1 MHz bandwidth, filter 24 would have a cutoff characteristic of approximately 500 kHz. In this way, the effect of the noise impulse is substantially reduced and minimized without degrading the image presented in the areas of movement.

The cutoff characteristic of filter 24 may, of course, be altered to fit the picture statistics in any given situation. The above-mentioned 50 percent cutoff characteristic for filter 24 and 50 percent coefficients in summing amplifier 23 are believed to represent good choices for a video-telephone type signal. If the picture statistics are such that movement is normally present in the picture with greater frequency than is present in a video-telephone system, segmenter 23 can be adjusted so as to couple only the stationary and very slowly moving parts of the video signal through summing amplifier 23. In this case, the value for each of the coefficients in summing amplifier 23 may be changed to 75 percent and 25 percent, with 75 percent of the output signal on line 21 represented by an amplitude of the input video signal on line 11. In addition, the cutoff characteristic of low-pass filter 24 may be raised to a point higher than 50 percent of the normally present bandwidth in the transmission channel.

Movement detector 23 is substantially the same as the movement detector which was described in a copending application of D. J. Conner-J. O. Limb-R. F. W. Pease-W. G. Scholes, Ser. No. 192,283, filed Oct. 26, 1971. It is nevertheless disclosed herein in FIGS. 2 and 3 in order to provide a complete disclosure of the present invention. The present movement detector differs from the one shown in the above-identified application only in that it does not contain a path which simulates the noise produced by a presvious element-to-element encoding.

Figure 2:
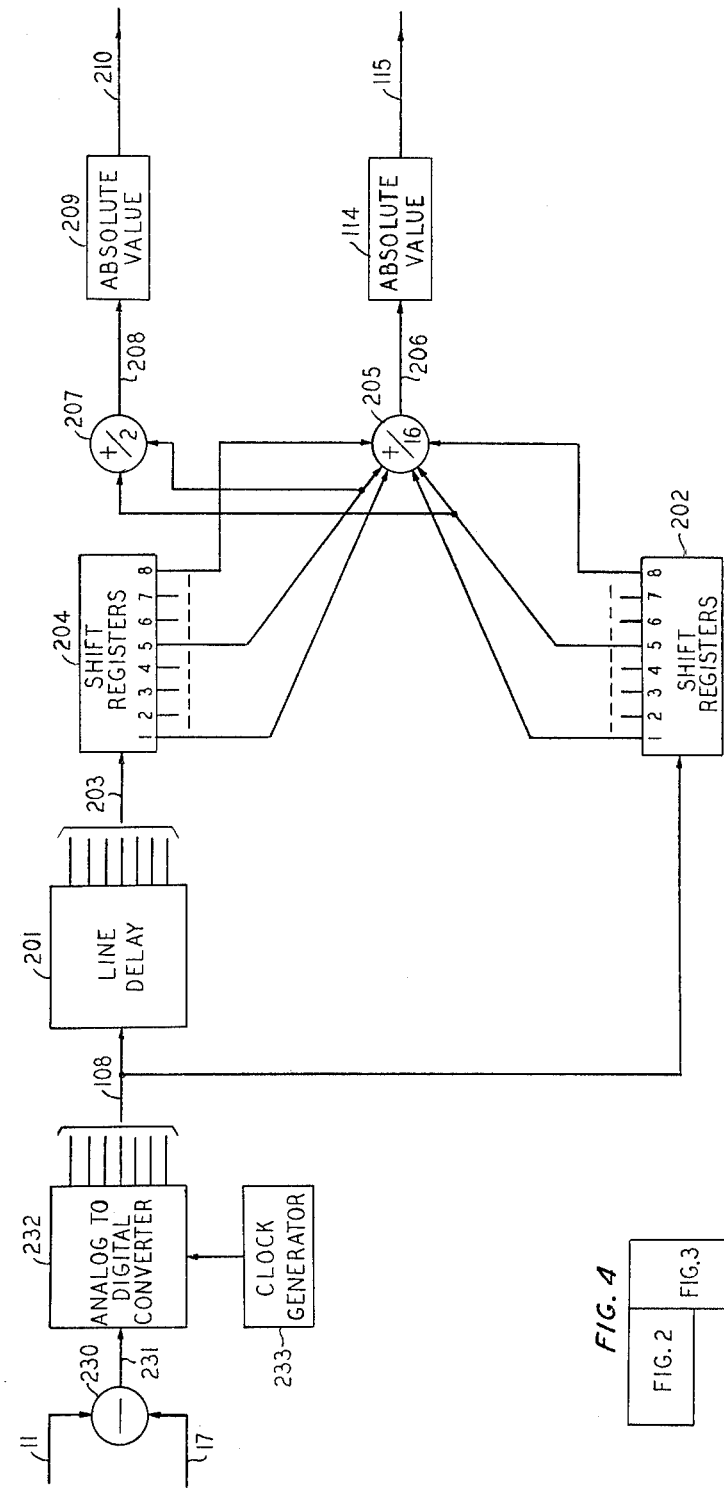
Figure 3:
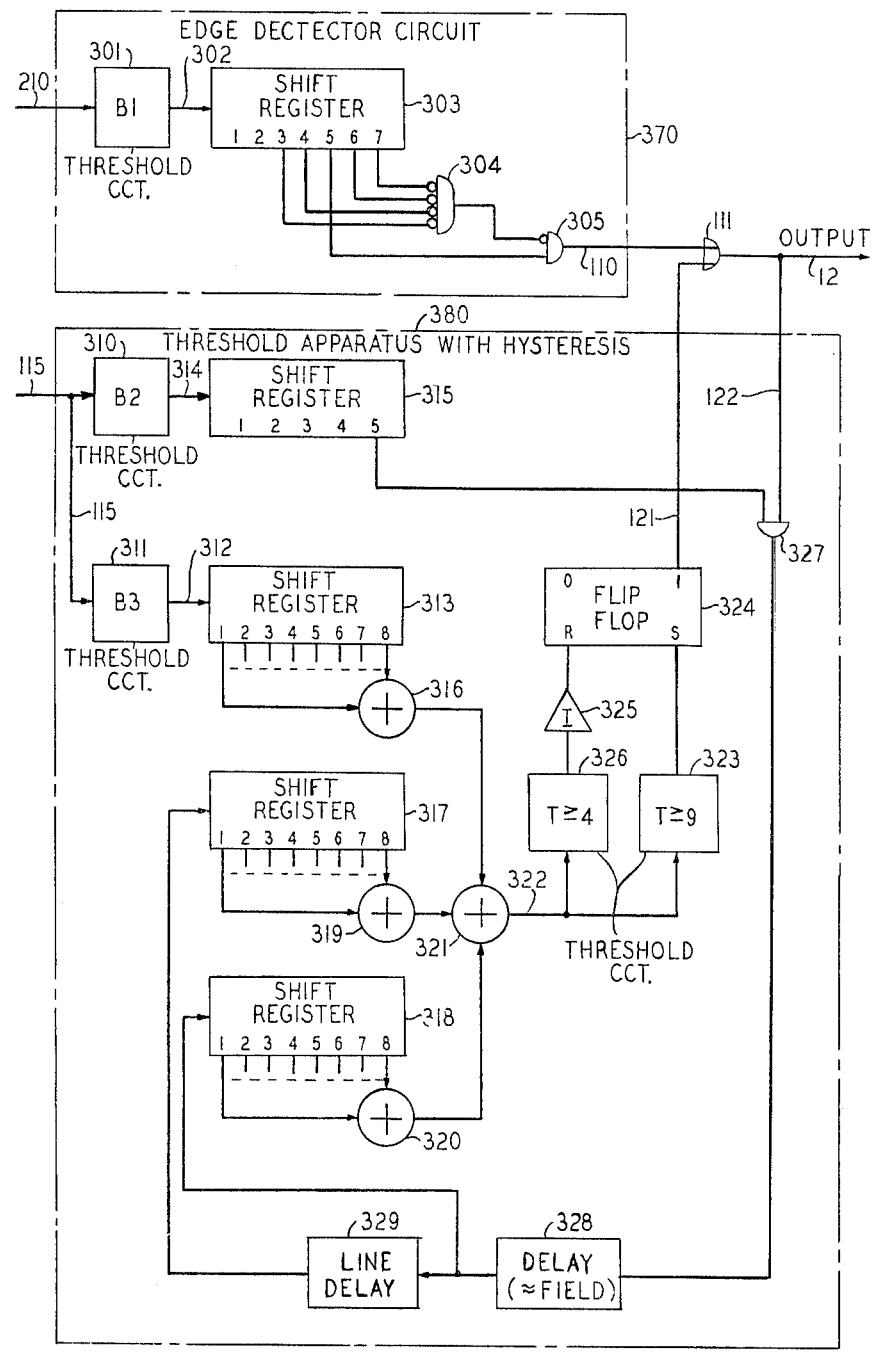

The movement detector in FIGS. 2 and 3 is designed to be insensitive to uncorrelated noises such as random noise.

In FIG. 2, the video signals present on lines 11 and 17 are each coupled to one input of a two-input difference amplifier 230. The difference signal at the output of amplifier 230 is coupled by way of line 231 to the input of an analog-to-digital converter 232. Clock generator 233 delivers clock pulses to a control input of converter 232 which pulses occur at a rate corresponding to the bandwidth of the video signals present on line 11. In response to each clock pulse, converter 232 samples the difference signal on line 231 and produces a digital word on bus 108 whose value is an indication of the magnitude and sign of the difference signal on line 231.

Each digital word on bus 108 (representing a frame-to-frame difference in picture element amplitudes having the same spatial point in the video frame) is coupled to the input of a delay line 201 and to the input of shift registers 202. Each block designated as shift registers in FIG. 2 is actually constructed of a plurality of shift registers equal in number to the number of bits in the digital word coupled to its input. Each shift register of the plurality is coupled to receive a different one of the bits in the digital word. Shift registers 202 has a capacity to store eight adjacent picture element amplitudes. Each new digital word that is presented on bus 108 is coupled into cell 1 of shift registers 202, and the digital words which were present in the cells are each caused to shift to a cell having a designating number higher in value by one.

Delay line 201 presents delay to the digital words on bus 108 equal in duration to the time interval of one video line. Accordingly, when a difference word for a picture element is presented on bus 108 the difference word for the picture element directly above it in the preceding video line is present on bus 203 at the output of delay line 201. This digital word on bus 203 is coupled into cell 1 of shift registers 204. Hence, shift registers 202 and 204 store the frame-to-frame difference words for eight picture elements in each of two adjacent video lines in each video field.

The digital word present in each of the cells of shift registers 202 and 204 is coupled to one input of a 16-input averaging circuit 205. This averaging circuit, like averaging circuits 207 and 224 to follow, is actually constructed of an addition circuit followed by a divider circuit which divides the sum out of the addition circuit by a constant equal to the number of inputs to the addition circuit. The resulting signal on line 206 out of averaging circuit 205 is coupled to the input of an absolute value detector 114 which in turn presents the absolute value of the averaged signal on line 115. This value presented on line 115 is therefore equal to the absolute magnitude of the average of all frame-to-frame difference words for the picture elements in an area encompassing eight picture elements in each of two video lines of the video field. The invention is, of course, in no way limited to the particular number of picture elements and video lines shown in the present embodiment. The value on line 115 could simply be checked against a threshold level in order to indicate whether or not movement has occurred in the area under consideration. To provide improved performance with greater immunity to noise, the remainder of the apparatus shown in FIGS. 2 and 3 is included in the movement detector 23.

The digital words present in cell 5 of each of the shift registers 202 and 204 are coupled to the inputs of an averaging circuit 207. The resulting signal out of circuit 207 is coupled by way of line 208 to an absolute value detector 209. The resulting value on line 210 is equal to the absolute value of the average of the frame-to-frame difference words for two picture elements vertically adjacent to each other in the spatial point format of the video field. The difference word in cell 5 of shift registers 202 is the difference word corresponding to the picture element presently under consideration at the two inputs of transmission gate 20 in FIG. 1. The picture element amplitudes stored in cells 6, 7 and 8 of shift registers 202 correspond to the picture elements which precede the picture element presently under consideration, whereas the picture element amplitudes stored in cells 1, 2, 3 and 4 correspond to the picture elements which follow the picture element presently under consideration.

The absolute value obtained on line 210 is coupled to the input of a threshold circuit 301 in FIG. 3. If the value on line 210 exceeds the threshold level within circuit 301, an energizing signal equivalent to a logical "1" is coupled by way of line 302 into cell 1 of a shift register 303. In the present embodiment, wherein the video signal amplitudes are permitted a range of 256 levels, the threshold level for circuit 301 is set equal to 10. This level is high enough such that it is unlikely to be exceeded by any average level of noise which may have occurred during both of the picture elements correspondins to cell 5 in each of the shift registers 202 and 204. Therefore, the threshold level of circuit 301 is high enough so that it is generally exceeded only as a result of a slowly moving high contrast edge in the picture or as a result of a spike of noise in either of the picture elements corresponding to cell 5 in each of the shift registers 202 and 204. To eliminate those logical "1s" which are presented on line 302 as a result of an isolated noise spike, the logical levels present on line 302 are coupled into an isolated point rejection circuit consisting of shift register 303, AND gate 304 and AND gate 305. Shift register 303 is clocked at the picture element rate, that is, at a rate equal to that of clock generator 233. Since shift register 303 has a capacity of seven cells, it therefore stores the logical states produced on line 302 during seven adjacent picture elements. If a logical "1" is present in cell 5 of shift register 303, it is coupled through AND gate 305 to produce an energizing signal on line 110 providing an energizing signal is not simultaneously present at the inhibit input of AND gate 305. Each of the cells 3, 4, 6 and 7 of shift register 303 is coupled to an inhibit input of AND gate 304 whose output in turn is connected to the inhibit input of AND gate 305. Hence, if cells 3, 4, 6 and 7 each contains a logical "0," the logical "1" present on cell 5 is inhibited by gate 305 and therefore no energizing signal results on line 110. The situation presented when the energizing signal in cell 5 is prohibited from causing an energizing signal on line 110 corresponds to the case where an isolated spike of noise may have caused a frame-to-frame difference in the picture element corresponding to cell 5. In this type situation, since the frame-to-frame difference has not been produced by movement, the picture elements corresponding to cells 3, 4, 6 and 7 will not have produced frame-to-frame difference values of sufficient magnitude to exceed the threshold level in circuit 301. Here again, as in shift registers 202 and 204, a delay of approximately five picture elements is introduced between the logical signal of interest on line 302 and its corresponding output on line 110. As will be apparent hereinafter, the remainder of the apparatus shown in FIG. 3 also introduces a delay approximately equal to five pictue elements between the absolute value detector 114 and the corresponding output signal on line 121.

As pointed out hereinabove, this value on line 115 could be simply checked against a threshold level lower than that of circuit 301 and any resulting energizing signals could be taken as indications that movement has occurred within the area under consideration. To increase the efficiency of performance, however, the apparatus shown in FIG. 3 designated by the numerals 310 through 329 provide a threshold apparatus 380 with hysteresis wherein detection of a moving edge in one frame with a resulting signal on line 110 is required before the area signal on line 115 is permitted to result in indications of movement.

The signal on line 115 is converted into two binary functions by threshold circuits 310 and 311. If the signal on line 115 exceeds the predetermined threshold level of circuit 311, an energizing signal equivalent to a logical "1" is produced on line 312 at the input of a shift register 313. Similarly, if the signal on line 115 exceeds the threshold level of circuit 310, an energizing signal is produced on line 314 at the input of a shift register 315. The threshold levels of circuits 311 and 310, designated in the drawings as B3 and B2, respectively, are adjusted in the present embodiment such that B3 is greater than B2. In the present embodiment, where the video signal is permitted to assume any one of 256 levels, B3 is adjusted to a threshold level of 4, and B2 is adjusted to a threshold level of 2. Shift registers 313 and 315, like shift register 303, are clocked at the picture element rate by clock generator 233.

The logical states produced on line 312 during eight picture elements are stored within shift register 313. Each logical "1" stored within shift register 313 represents one vote in favor of indicating that movement has occurred in the area including the eight picture elements corresponding to the cells in shift register 313. All eight cells in shift register 313 are coupled to the inputs of a summation circuit 316. In a similar fashion, votes which are cast for movement during the picture elements in the lines of the previous field (above and below the line presently being considered in shift register 313) are stored, in a manner to be described hereinafter, within shift registers 317 and 318, respectively. The energizing signals stored in the cells of shift registers 317 and 318 are summed in summation circuits 319 and 320, respectively. The sums produced at the output of each of the summation circuits 316, 319 and 320 are added in a final summation circuit 321 to produce an overall summation of votes on line 322 for an area of picture elements roughly centered about the picture element corresponding to cell 5 in shift register 313.

If the signal on line 322 indicates that nine or more of the 24 cells in shift registers 313, 317 and 318 are storing logical "1s," then threshold circuit 323 energizes the set input of a flip-flop 324. With flip-flop 324 set, an energizing signal is provided to OR gate 111 by way of line 121. This energizing signal will remain on line 121 as long as flip-flop 324 remains in its set state. Flip-flop 324 is reset when the inverting circuit 325 produces a logical "1" signal at its output. This in turn will occur only when the level on line 322 drops to a point which is equivalent to less than four votes out of the total number of 24 votes represented by logical "1s" in shift registers 313, 317 and 318. This hysteresis type operation is achieved by coupling the signal on line 322 to the input of a threshold circuit 326 whose output energizes the input of inverting circuit 325 for all signal levels on line 322 corresponding to four or more votes out of the total number of 24 votes. In the fashion described thus far in connection with circuits 310 through 326, advantage is taken of the spatial correlation of frame-to-frame difference signals which have resulted in movement to produce an indication of movement on output line 12.

The logical state produced on line 314 is simply delayed by an interval equal to five picture elements in shift register 315. This delayed logical state is coupled from the output of the fifth cell in shift register 315 to one input of an AND gate 327. The other input of AND gate 327 is coupled by way of line 122 to the output line 12. If an output energizing signal appears on line 12 and, in addition, the signal on line 115 for the corresponding picture element has exceeded the threshold level on circuit 310, AND gate 327 provides an energizing signal to the input of a delay memory 328. This memory introduces a delay approximately equal to one video field minus one-half of a video line time. As a result, an energizing signal provided at its input will be coupled from the output of memory 328 into the first cell of shift register 318 when the signal corresponding to the picture elements immediately above it in the spatial format of picture elements is being coupled into the first cell of shift register 313. The output energizing signal from delay memory 328 is also coupled into a line delay 329. As a result, the energizing signal for a given picture element at the output of line delay 329 will be present at the input of shift register 317 when the logical state corresponding to the picture element immediately below it in the spatial format of picture elements is present on line 312. In this way, any indications of movement that occur on output line 12 during one video field in an area of picture elements encompassing eight picture elements of two adjacent video lines are caused to increase the sensitivity of the hysteresis threshold apparatus 380 to any votes for movement during the next video field in the line which interlaces the above-mentioned two adjacent video lines.

In the present embodiment, where the threshold level of threshold circuit 323 is equal to nine and the votes for only eight picture elements are registered in shift register 313, indications of movement on line 121 by hysteresis threshold apparatus 380 (circuits 310-329) will not be developed unless these circuits have been previously sensitized by the indications of movement in a previous field which have been developed by edge detector circuit 370 (threshold circuit 301 and the isolated point rejection circuits 303-305). In a first field containing movement, it is the edge detector circuit 370 which first develops the energizing signals on output line 12. These signals during the first field will in turn increase the sensitivity of the hysteresis threshold apparatus 380 to indications of movement in an area surrounding the moving edge. During subsequent fields, threshold apparatus 380 will then sweep out an area of picture elements surrounding the edge which has caused the initial indication of movement. Once movement has been detected in an area, however, threshold apparatus 380 will continue to sweep that area even though the edge has passed out of the area since the threshold required to deactivate this circuit is set by threshold circuit 326 at a level less than the total number of picture elements in each line under consideration.

The present invention is, of course, in no way limited by the particular thresholds used in the present embodiment or by the particular area of picture elements chosen in the present embodiment. Numerous modifications may be made by those skilled in the art without departing from the spirit and scope of the present invention.

I claim:

1. Apparatus for improving the signal-to-noise ratio in a video signal comprising means for storing a previously received video signal, means responsive to said video signal and said stored video signal for developing a combined signal, means responsive to said video signal for developing a bandwidth-limited signal, a movement detector responsive to said video signal and said stored video signal for developing a control signal, and a gating means responsive to said control signal for selectively coupling either said combined signal or said bandwidth-limited signal to an output terminal.

2. Apparatus as defined in claim 1 wherein said means for developing a combined signal includes a summing amplifier having one input connected to receive said video signal and a second input connected to receive said stored video signal, the combined signal being an algebraic summation of said video signal and said stored video signal.

3. Apparatus as defined in claim 1 wherein said means for developing a bandwidth-limited signal includes a low-pass filter having a cutoff frequency substantially lower than the highest frequency possible in said video signal.

4. Apparatus as defined in claim 1 wherein said movement detector includes means for developing a difference between said video signal and said stored video signal, and means for storing said difference over an interval equivalent to several picture elements in said video signal.

5. Apparatus as defined in claim 4 wherein said gating means includes at least one delay circuit whose delay time is less than said interval equivalent to several picture elements.

6. Apparatus as defined in claim 1 wherein said movement detector includes means for developing a difference between said video signal and said stored video signal, means for storing said difference over an interval equivalent to several picture elements in said video signal, means for developing a movement signal whose value is a function of the stored difference signals, and a threshold-senstive circuit for developing said control signal in response to the value of said movement signal.

7. Apparatus for transforming an input video signal to an output video signal at an output terminal with improved signal-to-noise ratio comprising delay means having an input coupled to said output video signal for providing a delayed output signal, a first filter means responsive to said input video signal and said delayed output signal for providing a combined signal at tis output, a second filter means coupled to said input video signal for providing at its output a bandwidth-limited signal, a movement detector responsive to said input video signal and said delayed output signal for providing a control signal at its output, and gating means responsive to said control signal from said movement detector for selectively coupling either the combined signal from said first filter means or the bandwidth-limited signal from said second filter means through to said output terminal.

8. Apparatus as defined in claim 7 wherein said first filter means includes a summing amplifier having a first input connected to receive said input video signal and a second input connected to receive said delayed output signal.

9. Apparatus as defined in claim 7 wherein said second filter means includes a low-pass filter whose cutoff frequency is substantially lower than the highest frequency energy in said input video signal.

10. Apparatus as defined in claim 7 wherein said movement detector includes means for developing a difference between said input video signal and said delayed output signal, means for storing the developed difference for an interval equal to a predetermined number of picture elements in said input video signal, means for developing a movement signal in response to the stored differences, and a threshold-sensitive circuit for developing said control signal in response to said movement signal.

11. Apparatus as defined in claim 10 wherein said gating means including at least one delay circuit whose delay is a fractional part of said intertal equal to a predetermined number of picture elements.

* * * * *